United States Patent [19]
Allen et al.

[11] Patent Number: 5,864,418
[45] Date of Patent: Jan. 26, 1999

[54] MULTI-BEAM SCANNER WITH MECHANICALLY MOVING ELEMENT FOR SCANNING IMAGING SURFACES

[75] Inventors: Roy D. Allen, Burlington, Mass.; Frank Scholten, Livingtson, N.J.

[73] Assignee: Bayer Corporation AGFA Division, Wilmington, Mass.

[21] Appl. No.: 706,339

[22] Filed: Aug. 30, 1996

[51] Int. Cl.⁶ .................................................. G02B 26/08
[52] U.S. Cl. ........................ 359/210; 359/204; 359/209
[58] Field of Search ............................. 359/204, 209–219, 359/305; 358/493, 474; 347/233–244; 250/234–236

[56] References Cited

U.S. PATENT DOCUMENTS

| | | | |
|---|---|---|---|
| 4,782,474 | 11/1988 | Arai et al. ................................. | 369/44 |
| 5,097,351 | 3/1992 | Kramer . | |
| 5,179,463 | 1/1993 | Kramer . | |
| 5,214,528 | 5/1993 | Akanabe et al. . | |
| 5,309,274 | 5/1994 | Akanabe . | |
| 5,311,321 | 5/1994 | Crowley ................................... | 359/305 |
| 5,412,501 | 5/1995 | Fisli ......................................... | 359/305 |
| 5,502,709 | 3/1996 | Shinada ................................... | 359/204 |
| 5,631,762 | 5/1997 | Kataoka ................................... | 359/204 |

FOREIGN PATENT DOCUMENTS

| | | |
|---|---|---|
| 475 399 | 3/1992 | European Pat. Off. . |
| 557 998 | 9/1993 | European Pat. Off. . |
| 632 434 | 2/1995 | European Pat. Off. . |

*Primary Examiner*—James Phan
*Attorney, Agent, or Firm*—Alfred A. Stadnicki

[57] ABSTRACT

A multibeam scanning system for scanning an imaging surface, includes at least one radiation emitter configured to emit a first beam of radiation and a second beam of radiation. A spin deflector, rotatable about a spin axis, is provided to direct the first beam to form a first scan line and the second beam to form a second scan line on the imaging surface. At least one moving element, such as a translating lens, disposed upstream of said spin deflector, operates to deflect at least one of the beams with respect to the spin axis of the spin deflector.

34 Claims, 13 Drawing Sheets

MULTI-BEAM SCANNER WITH MECHANICALLY MOVING ELEMENT FOR SCANNING IMAGING SURFACES

RELATED APPLICATION

This application is related to application Ser. No. 08/687,931, entitled "BEAM ERROR CORRECTION USING MOVABLE CORRECTION ELEMENT", filed Jul. 29, 1996 and to application Ser. No. 08/687,928, entitled "BEAM ALIGNMENT CORRECTION ELEMENT ASSEMBLY", filed on Jul. 29, 1996.

1. Technical Field

The present invention relates to beam scanning systems and more particularly to multi-beam scanning systems with a mechanically moving element for deflecting a beam in one or two directions to scan imaging surfaces such as those utilized in offset printing operations.

2. Background Art

Modern electronic prepress operations utilize laser scanning systems to write or record images for subsequent reproduction or to scan a prerecorded image at a predefined resolution rate. Such scanning systems may write or record images or scan prerecorded images on various prepress media including, photo or thermal sensitive paper or polymer films, photo or thermal sensitive coatings or erasable imaging materials mounted onto an image recording surface or photo or thermal sensitive paper, polymer film or aluminum base printing plate materials, all used in electronic image reproduction. Such media are mounted onto a recording surface which may be planar but which is more typically curved and scanned with a recording or scanning beam.

The primary components of such a system include a recording surface, usually a drum cylinder and a scan mechanism disposed and movable within the drum cylinder. The system also includes a processor, with an associated storage device, for controlling the scanning mechanism and for scanning a prerecorded image, a photodetector and detector processor. The processor and associated storage device may be housed within the system itself or separate from the system with appropriate interconnection to the system.

The processor, in accordance with stored programming instructions, controls the scanning mechanism to write or read images on the plate or other medium mounted to the inner drum cylinder wall by scanning one or more optical beams over the inside circumference of the drum cylinder while the drum cylinder itself remains fixed.

The scanning and hence the recording are performed over only a portion of the cylinder inner circumference, typically between 120° and 320° of the circumference of the drum cylinder. The optical beam(s) are typically emitted so as to be parallel with a central axis of the cylinder and are deflected, by for example, a spinning mirror, Hologon or Penta-prism deflector so as to form a single scan line or multiple scan lines which simultaneously impinge upon the recording surface. The deflector is spun or rotated by a motor about an axis of rotation substantially coincident with the central axis of the drum cylinder. To increase the recording speed, the speed of rotation of the beam deflecting device can be increased. To even further increase the recording speed, multiple beam scanning has been previously proposed.

One such proposed multiple beam scanner has utilized a spinning dove prism with a single light source, as discussed, for example, in U.S. Pat. No. 5,214,528. Using a dove prism beneficially allows the use of a multiple beam source, e.g. a laser diode array, while eliminating the need for multiple beam correction elements and associated hardware. Additionally, for reasons which need not be discussed here, the scan speed of multiple beam systems using a dove prism can exceed that of other types of proposed multi-beam systems.

U.S. Pat. No. 5,097,351 proposes another type of multi-beam scanning system which utilizes a controlled piezo-reflecting mirror, or what might be better characterized as a wobbling mirror, in lieu of a dove prism. In this system, each of two laser beams follow separate optical paths. Each optical path has focusing and collimating lenses and an acousto-optical modulator (AOM). Hence, the proposed system requires both AOMs and a wobbling mirror. The controlled wobble reflector is disposed in only one of the optical paths, i.e. the wobbling mirror reflects only one of the two beams, and is driven to redirect, e.g. rotate, the reflected beam in synchrony with the rotation of the spin deflector. Errors in the direction of the redirected beam are detected, and corrected by driving the wobbling mirror to adjust angular alignment during recording operations.

It is of primary importance that the multiple light beams contact the spin deflector as close as possible to a desired location to ensure that the appropriate scan lines are formed on the recording surface and hence the desired image is properly recorded. This includes maintaining the desired spacing or overlapping relationship of the simultaneously scanned beams with respect to each other and the reduction or elimination of any differential scan line bow between successive scan lines.

A wobble, for example in the spinning dove prism of the '528 patent or degradation in performance due to wear in moving components of the support structure, will cause a misalignment of the element with respect to the spin deflector and can create significant banding artifacts in the scan lines which repeat every two scan passes. The effect of misalignment on system banding can be reduced, for example, by increasing the ratio of the beam diameter at the spinning prism to the beam diameter at the spin reflector. However, alignment errors, can also create a twinning between groups of the multiple beams. This is because in the proposed systems the spin prism rotates only half a turn for each full turn of the spin deflector. Accordingly, if a misalignment exists, the multiple beam system is restricted to recording during only every other rotation of the spin deflector to obtain high quality results. A four beam system is accordingly only two times faster than single beam system, an eight beam system only four times faster, and so on.

Further, in multi-beam systems at least one of the light beams must be redirected in synchrony with the rotation of the spin deflector. Any synchronization errors between the redirection of the redirected beam(s) and the angular position of the spin deflector will make it impossible to obtain a proper scan of the recording surface and result in improper or unsatisfactory recording of the image. Small changes in the phase locking of spin or wobble element motion and spin deflector rotation can create banding groups.

If the multiple beams leaving the dove prism described in the '528 patent or the beam reflected from the wobbling element described in the '351 patent drift or flutter relative to the spin deflector, due for example to small motor speed variations or wobble mirror driver inaccuracies, the cross-scan spacing between the multiple scan lines may change, one or more scan lines may bow and/or scan lines may become non-parallel even to the point of intersecting, and this will create visible artifacts, e.g. banding. The '351 patent, as can best be understood, proposes a technique for correcting synchronization errors between the described wobbling mirror and the spin deflector using a quad detector and feedback arrangement to control the wobbling mirror to adjust the motion of the wobbling mirror to correct for synchronization errors.

The above reference related Ser. No. 08/687,931 application discloses an improved multi-beam scanning system which includes a spinning element, such as a dove or wedge prism in conjunction with a correction element, such as described in the above referenced related Ser. No. 08/687,928 application, to correct beam alignment errors in a spin element of the type described in the '528 patent. The above referenced Ser. No. 08/687,931 application also discloses improved techniques for correcting synchronization errors between the rotation of the spin or wobble element and the spin deflector. Accordingly, the inventions described in the above referenced related applications, which are incorporated herein in their entirety by reference, can be utilized to improve on previously proposed systems, such as those disclosed in the '528 patent, by correcting misalignments in the spin element, and hence the misalignment of the beam being rotated by the spin element with respect to the spin deflector. Additionally provided are improved techniques for correcting synchronization errors between the spin or wobble element and the spin deflector of the '528 or '351 patents. However, the system described in the Ser. No. 08/687,931 application requires a spin element as well as a correction element such as a translating lens.

OBJECTIVE OF THE INVENTION

It is an object of the present invention to provide a multi-beam scanning system which does not require a spin or wobble element to rotate one or more of the multiple beams.

It is another object of the present invention to provide a multi-beam scanning system with reduced banding and/or twinning.

It is a further object of the present invention to provide a multi-beam scanning system which scans multiple beams having a desired geometric relationship with respect to each other.

It is yet another object of the present invention to provide a multi-beam scanning system which scans multiple beams in a desired manner with respect to the spin axis of a spin deflector.

Additional objects, advantages, novel features of the present invention will become apparent to those skilled in the art from this disclosure, including the following detailed description, as well as by practice of the invention. While the invention is described below with reference to preferred embodiments for electronic prepress applications, it should be understood that the invention is not limited thereto. Those of ordinary skill in the art having access to the teachings herein will recognize additional applications, modifications, and embodiments in other fields, which are within the scope of the invention as disclosed and claimed herein and with respect to which the invention could be of significant utility.

SUMMARY OF THE INVENTION

In accordance with the present invention, a multibeam scanning system and method are provided which are particularly suitable for implementation in high quality graphic arts image setters, platemakers or scanners. The scanning system includes one or more laser light or other type of radiation emitter or emitter array which emits one or more beams on a path(s) directed towards a spin deflector, such as a spin mirror, Hologon or Penta-prism, configured to deflect and scan the beams onto a curved imaging surface of, for example a cylindrical drum to record or write the image.

In accordance with the present invention, the multi-beam scanning system includes at least one radiation emitter configured to emit a first beam of radiation and a second beam of radiation. A spin deflector, rotatable about a spin axis and configured to direct the first beam to form a first scan line and the second beam to form a second scan line on the imaging surface is also provided.

A beam deflecting translating lens element or an acousto-optic modulator element (AOM) is disposed in the path of one or more of the beams, upstream of the spin deflector. Each AOM is operable to deflect a beam with respect to the spin axis of the spin deflector and in synchrony with rotation of the spin deflector. Each AOM can serve to both modulate and deflect a beam simultaneously or may be used only to deflect a beam. The translating lens element may be translatable in two directions, which are preferably substantially orthogonal to each other. The translating lens element can thus simultaneously deflect a beam in the two directions. The deflection of the beam in the first and second directions causes the beam to be redirected so as to move in relationship with the spinning of the spin deflector about the spin axis, such that the first scan line and the second scan line are non-intersecting, preferably parallel and have minimal bow.

A pixel clock, and beneficially a clock phase shifter, may be provided for timing the emitting of radiation which forms the deflected beam or for modulation of the beam by the AOM element. In such a case, the acousto-optic modulator or translating lens element is operated to deflect the beam so as to move linearly, i.e. form a single unfocused line scan, across the spin deflector and the pixel clock and clock phase shifter are operated in synchrony with the operation of the applicable element to phase shift the beam. Hence if a pixel clock is utilized, the translating lens need only be translatable in a single direction. The pixel clock may control emission from a radiation source, such as a laser diode, rather than the AOM, if desired. The deflection of the beam causes the deflected beam to be redirected and move linearly across the spin deflector by an amount equal to one pixel in length at the imaging surface and in relationship with its rotation about the spin axis, such that the first scan line and the second scan line are non-intersecting and preferably parallel with minimal bow. It should be understood that the scan length across the spin mirror is relatively short as compared to the unfocused diameter of the beam at the spin mirror. The beams impinging upon the spin mirror are overlapping. The amount of overlap will depend on the desired spot size, optical gain and other factors which will be recognized by those skilled in the art. The phase shifting of the beam causes the first and second scan lines to be in phase.

Using a pixel clock, auxiliary deflection of a laser beam about a two dimensional image plane is performed without requiring physical deflection of the laser beam in two orthogonal directions. Hence, the equivalent of two dimensional deflection is achieved with only a single axis deflector by applying timing variations to the writing beam pixel clock in synchronism with the motions of a single axis auxiliary deflector, e.g., an AOM, or moving element such as a translating lens or oscillating mirror. In this way, beam displacement errors occurring in any on-axis beam deflection system such as those used in an internal drum recorder can be compensated. Such compensation can be used for correction of displacement errors, such as bow, etc., produced by other components in a scanning system, particularly in the applications requiring multiple writing beams.

It will be understood that the pixel control uniquely takes advantage of the fact that the spinner rotates the axes of the writing head. Since any single axis in the writing head projected onto the imaging surface ultimately has components in both orthogonal axes of the writing surface as the spinner rotates, the fixed axis of the image representing time, i.e., the in-scan axis of the image surface, can be used to reduce a deflection along a given axis of the writing head to a single cross-scan deflection component orthogonal to the time or in-scan axis on the image surface. Therefore, two direction, i.e., 2D deflection at the image surface is provided by proper phase control of the clock signal and a single axis deflection at the writing head. Using an AOM to create the deflection at the writing head results in total electronic control of the beam in two dimensions at the image with no moving parts and with response times of less than a microsecond possible.

In contrast to the clocked single axis deflection which sweeps the beam linearly back and forth across the surface of the spinner, using the earlier described two dimensional deflection at the writing head causes the beam to track the rotation of the spinner and actually move, e.g. rotate, with it so as to keep the beam on a fixed point on the spinner surface. The latter requires a nonlinear sinusoidal correction function while the former requires a tan (angle/2) function which is nearly linear and can be approximated to within 5% error by a simple linear sawtooth function. It will be recognized that linear ramp functions may be more beneficial for AOM deflection because the traveling acoustic grating produced in the AOM has a fixed relationship throughout the length of the ramp function thereby avoiding the time varying distortion of the beam shape associated with diffraction by a non-linear grating.

In accordance with other aspects of the invention, an acousto-optic modulator element and a translating lens may both be included in the system. These elements are conjunctively operated in synchrony with each other to deflect a beam in two directions. For example the acousto-optic modulator may deflect the beam in a first direction, while the translating lens element is translated to deflect the beam in a second direction, which is preferably substantially orthogonal to the first direction. The deflection of the beam in the first and the second directions causes the beam to be redirected so as to move, e.g. rotate, in synchrony with the rotation of the spin deflector about the spin axis such that the first and second scan lines are non-intersecting and preferably parallel with minimal bow.

In accordance with still other aspects of the invention, the scanning system may include a detector, such as a quadrature detector, configured to detect the geometric relationship between the deflected beam(s) and another beam or a reference corresponding to the spin axis of the spin deflector, after deflection of the beam(s) with respect to the spin axis of the spin detector. The detector may include a photosensor, e.g. charge couple device (CCD), a photodetector, e.g. a photodiode array, or any other suitable light detection device. As may be desirable, the detector can be configured to detect the geometric relationship prior to and/or during writing on the imaging surface. A controller is typically included to control the operations of the translating lens and/or acousto-optic modulator element, as well as the pixel clock and clock phase shifter, in accordance with the detected relationship.

In operation, the radiation emitter(s) could be configured to transmit the first beam along a path so as to impinge upon the spin deflector at a first location relative to the spin axis of the spin deflector and the translating lens and/or the acousto-optic element could be configured to deflect the second beam onto a path so as to impinge upon the spin deflector at a second location which is different than the first location. In such a case, the first location will ideally be coincident with the axis of rotation of the spin deflector which preferably coincides with the longitudinal axis of a cylindrical drum on which the imaging surface is mounted.

However, it is more likely that even if the first beam is intended to impinge upon the spin deflector at its spin axis, some degree of error will exist such that an offset will exist between the point of contact of the beam on the spin deflector and the spin axis. Therefore, it may in many, if not most, instances be preferable to deflect all beams so as to impinge the mirror at desired locations which are offset from the spin axis. For example, it may be advantageous for multiple beams to impinge upon the spin deflector at an equal distance from the spin axis or offset from the spin axis and equally spaced from each other. It would appear advantageous for the respective beams to impinge on the spin deflector relatively close to the spin axis and, to the extent practicable, in opposed paired locations. In such a case a separate deflection element (i.e. translating lens or beam deflecting AOM) is disposed in each beam path, although this may not necessarily be mandatory.

From the above, it can be seen that in accordance with the present invention the redirection of one or more beams in a multi-beam system is accomplished without the need for a spinning dove prism or wedge such as those described in the above referenced related Ser. No. 08/687,931 application.

DESCRIPTION OF PREFERRED EMBODIMENT

Figure 1:
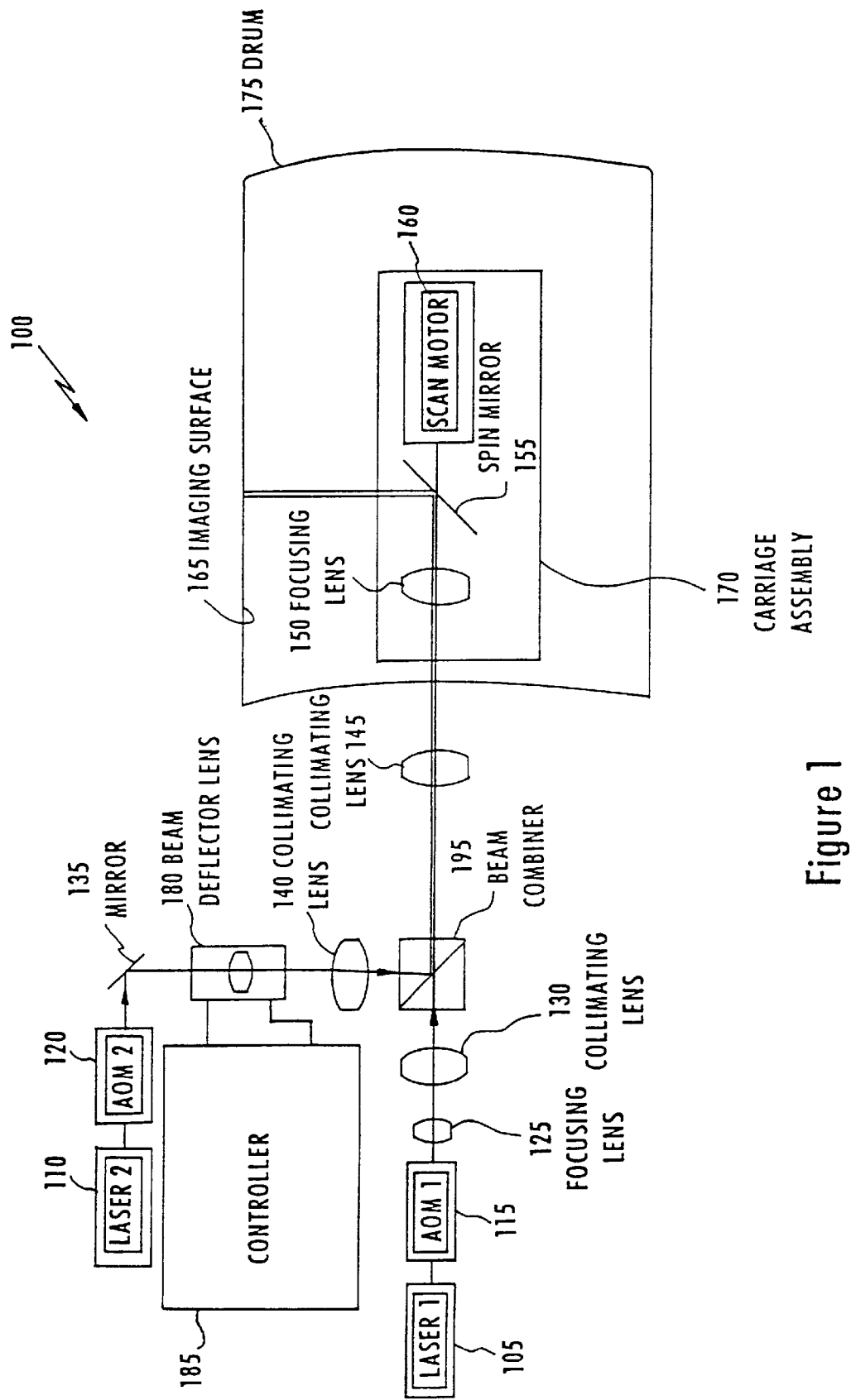
FIG. 1 depicts a first embodiment of a multi-beam scanning system having a two direction beam deflecting lens element in accordance with the present invention.

Before beginning the detailed description of the embodiments shown in the drawings, it should be noted that although each of the preferred embodiments is described in terms of a two-beam system, those skilled in the art will recognize that the systems depicted are not limited to two beams but could have any number of beams. In the case of those systems which include a beam deflecting AOM, additional beams could be added by simply providing additional beam deflecting channels in a multichannel AOM or additional beam deflecting AOM's which are separately clocked and controlled to provide the necessary beam deflections. In the case of systems including a beam deflecting lens, an additional lens could be added to deflect each added beam. Of course, beams which impinge on the spin deflector at the spin axis would not need to be deflected. If multiple beams are to be deflected, it would appear beneficial for the beams to be redirected so as to impinge upon the spin deflector in paired locations which are an equal distance from the spin axis and opposite to each other. The offset from the spin axis is also advantageously minimized to the extent possible in view of the intended application.

FIG. 1 depicts a first embodiment of a multi-beam scanning system 100 with a beam deflecting lens element in accordance with the present invention. As depicted, the system includes a first laser 105 which generates a laser light beam directed on a first path to the acoustic-optic modulator (AOM) 115 which modulates the first beam before it passes through focusing lens 125 and collimating lens 130. The beam is directed substantially along the longitudinal axis of the cylindrical drum 175 which is substantially coincident with the spin axis of spin mirror 155. After collimating, the beam is directed to the beam combiner 195.

Also depicted is a second laser light generator 110 which generates a laser light beam and directs the beam on a second path through acousto-optic modulator 120 which independently modulates the second beam. The beam is then reflected off stationary mirror 135 to beam deflector lens 180 which is controlled by controller 185 to translate in two directions simultaneously thereby redirecting the second beam in proper relationship with the rotation of the spin mirror. It should be noted that the above described AOM's serve solely as modulators and could be eliminated if desired by performing modulation at each laser in a conventional manner using for example, clocked laser diodes.

The beam deflector lens 180 can be configured in an assembly and driven as described in the above referenced related Ser. No. 08/687,928 application. As described in detail therein, the beam deflector lens 180 can be driven by electromagnetically, piezoelectrically or otherwise to translate in at least two orthogonal directions about its stationary optical axis to deflect the beam emitted by laser 110 so as to impinge upon the spin mirror 155 at a desired point a distance from the spin axis of the spin mirror 155. The two direction translation of the lens also redirects the beam in synchrony with the rotation of the spin mirror 155 effectively maintaining the beam on the desired point on the spin mirror surface as the spin mirror rotates. This redirection of the beam results in non-intersecting, e.g. parallel, scan lines with minimal bow, being produced by the first and second beams reflected off the spin mirror 155 onto the imaging surface 165. That is, the first beam is directed at the point on the reflecting surface at the spin mirror which intersects the spin axis. This beam is unaffected by the rotation of the spin mirror. The other beam is redirected such that it impinges on the reflecting surface of the spin mirror at a desired point on the mirror surface which is a preset distance from the spin axis. Accordingly, the latter beam moves so as to continue to impinge upon the mirror at the desired point as the spin mirror is rotated. In this way, both beams will form parallel scan lines on the imaging surface.

The redirected beam propagates from the beam deflector lens 180 through the collimating lens 140 and to beam combiner 195. The combined beams are then directed from the beam combiner 195 through collimating lens 145 and focusing lens 150 so as to impinge upon spin mirror 155. Spin mirror 155 is driven by scan motor 160 to rotate, thereby scanning the light beams onto the curved imaging surface 165 mounted inside cylindrical drum 175. As depicted, the focusing lens 150, spin mirror 155 and scan motor 160 all form part of the carriage assembly 170 which is moveable longitudinally through the drum 175. However the entire system, including the lasers 110 and 105, and controller 185, could if desired be included in the carriage assembly.

As described above, the system depicted in FIG. 1 provides dual scanning beams on a curved imaging surface 165 without the need for a spin element, such as a spinning dove prism or wedge, or a wobbling element such as a piezo control wobble mirror, to provide non-intersecting multiple scan lines on the curved imaging surface 165. Accordingly, a substantially simplified system is provided in which only a single precessing or translating element is required to redirect a beam which will impinge upon a rotating spin deflector such that multiple non-intersecting and preferably parallel beams will scan the curved imaging surface disposed inside the cylindrical drum.

Figure 2:
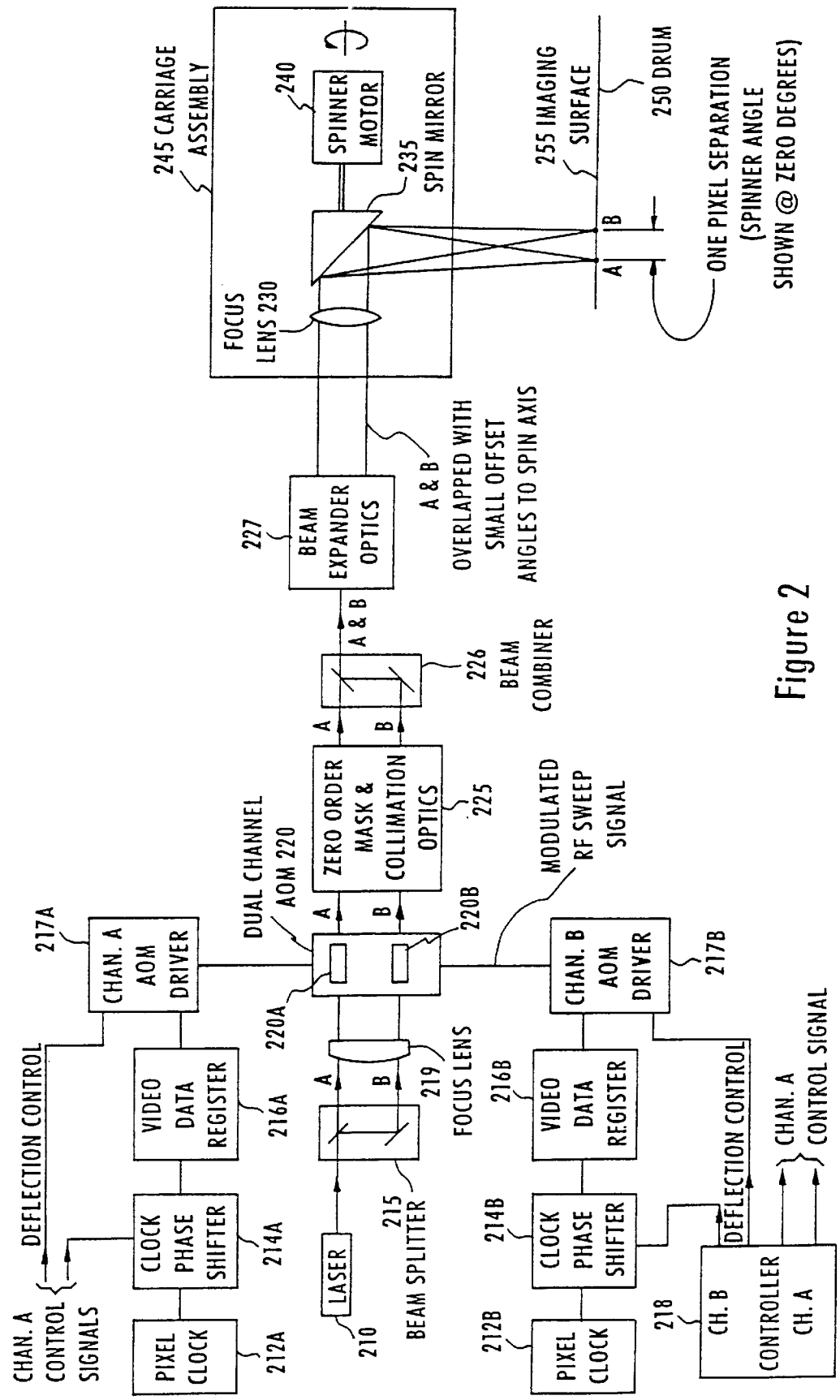
FIG. 2 depicts a second embodiment of a multi-beam scanning system having a beam deflecting acoustic-optical modulator (AOM) element and pixel clock in accordance with the present invention.

FIG. 2 depicts another system 200 for providing multiple non-intersecting beams on a curved imaging surface without the need of a spin or wobble element. As depicted in FIG. 2, a laser 210 generates a laser light beam. The beam is directed to a beam splitter 215 which may for example be a multilayer dielectric coated mirror or a grating element having a predefined wavelength. The two beams emitted from the beam splitter 215 are focused by focusing lens 219 and directed through a dual channel AOM 220.

The first beam is directed through a first channel 220A of the dual channel AOM 220 thereby generating a first propagating first order beam A. The second beam is passed through a second channel 220B of the dual channel AOM 220 to generate a second propagating first order beam. The dual channel AOM 220 is a beam deflecting AOM which is controlled by controller 218 to respectively deflect the first order beams in a single direction with respect to the spin axis of the spin mirror 235, such that each forms a separate linear unfocused scan line across the spin mirror 235 and offset from the spin axis of spin mirror 235, while simultaneously modulating the beams. In this embodiment both laser beams A and B are offset from the spin axis by an equal and opposite amount in the axis orthogonal to the AOM deflection axis by a set of fixed angle offsets in beam combiner 226. The unfocused beams A and B are redirected to move linearly across the spin deflector 235 by an amount equal to one pixel in length at the imaging surface. The scan length is substantially less than the unfocused beam diameter at the spin mirror 235. The beams are overlapping. The actual amount of overlap will depend on the spot size, optical gain and other factors.

Pixel clocks 212A and 212B and clock phase shifters 214A and 214B are also connected to the AOM 220 via video data registers 216A and 216B and AOM drivers 217A and 217B, which produce radio frequency (RF) sweep signals modulated by the video data, to time emissions from the respective AOM channels 220A and 220B on a pixel by pixel basis such that the emission of the laser light which is directed through the respective channels 220A and 220B of the dual channel AOM 220 are synchronized with the rotation of the spin mirror 235 and so as to phase shift the beams passing through the respective channels of the dual channel AOM 220. The respective timing of each beam modulation is cyclically adjusted synchronous with spinner rotation to compensate for the in-scan component of bow error on the image surface and to eliminate the in-scan component of the rotating vector representing the AOM deflection axis projected onto the image surface thereby providing for dimensional correction of pixel placement error, i.e. scan line bow, at the image surface. By applying the proper amounts of cyclic AOM deflection and pixel clock phase shift in synchronism with the spin mirror 235, the two dimensional placement errors of the respective laser beams are corrected without requiring the beams to be acted upon by an element such as a spinning dove prism or wedge, a wobbling mirror, or a translating lens. Accordingly, the respective laser beams are deflected cyclically and simultaneously to form a linear scan on the spin mirror 235 and the rotation of the spin mirror 235 scans the linearly scanned beams on the imaging surface 255 as two non-intersecting scan lines with minimal bow.

If desired, a third beam could be directed through a non-deflecting AOM channel and along a path coincident with the spin axis of the spin mirror 235, and preferably with the longitudinal axis of the cylindrical drum 250. The beams emitted from the dual channel AOM 220 are focused and collimated in the zero order mask and collimation optics 225 and combined in beam combiner 226 into a pair of nearly coaxial beams having a small offset angle relative to the spin axis of spin mirror 235. The combined beams are focused to two points on the imaging surface 255 by focusing lens 230 before impinging on spin mirror 235. The spin mirror 235 is rotated by spinner motor 240 such that two focused beams are deflected onto the imaging surface 255 of the cylindrical drum 250. As depicted, the focus lens 230, the spin mirror 235, and spinner motor 240 are all part of a carriage assembly 245 which moves longitudinally through the cylindrical drum 250.

Figure 3A:
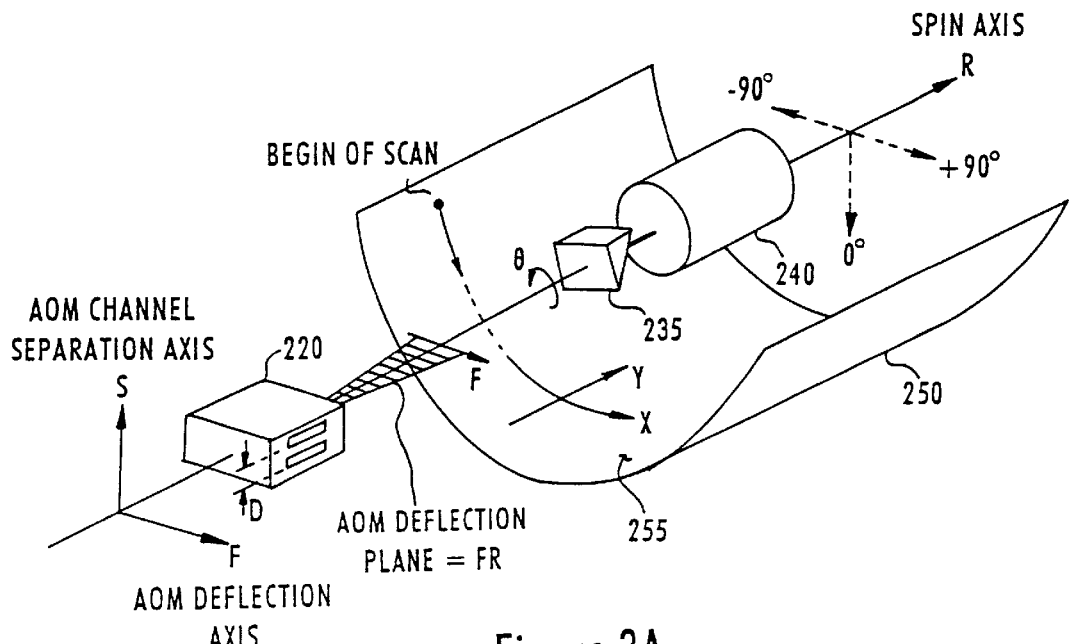
FIG. 3A is a perspective view of the AOM, carriage assembly and drum depicted in FIG. 2.

The proper selection of the angles for the reflective surfaces of the beam combiner 226 establishes the fixed beam offset angles in the beam separation axis S, as shown in FIG. 3A, such that after optical magnification by beam expander optics 227, a one pixel separation between beams A and B at the imaging surface results. The depicted beam expanding telescope expands the diameter of the collimated beams for projection along the axis of the drum towards the linearly translating carriage assembly 245 to be intercepted by the final focus lens 230 and spin mirror 235. Alternatively, the optics preceding the beam combiner may be used to set the fixed offset angles. The beam combiner 226 can have additional functions such as to split off a small amount of light to a beam intensity sensor which provides closed loop feedback to the AOM drivers 217A and 217B to maintain constant beam intensity during the cyclic RF frequency sweep function.

It will be recognized by those practiced in the art that the functions of the zero order mask and collimation optics 225, the beam combiner 226, and the beam expander 227 can be replaced with a single telescope and zero order mask without a beam combiner, in which case the physical separation distance between the channels in the dual channel AOM 220 is used to established the one pixel separation at the imaging surface. Various other means could also be used to provide a fixed one pixel separation between beams A and B at the imaging surface.

Figure 3B:
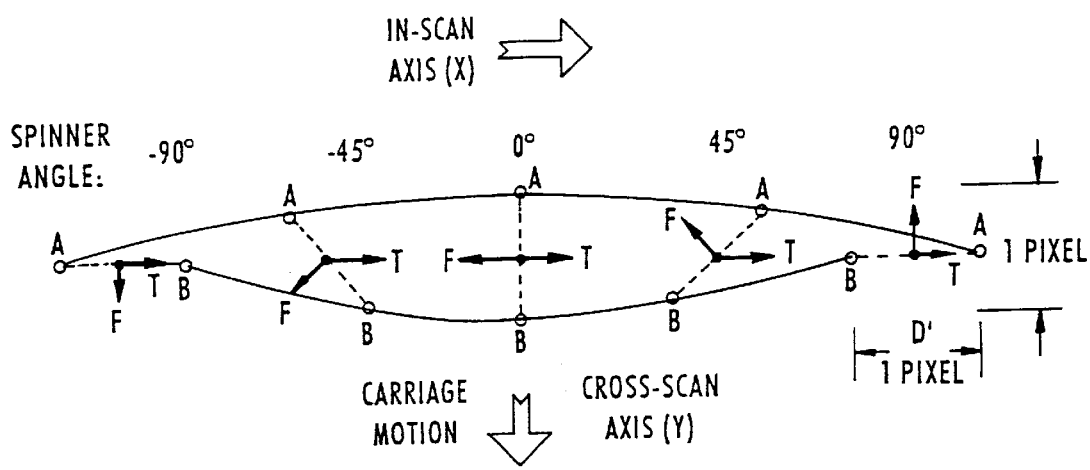
FIG. 3B shows the rotation of the AOM coordinate axes depicted in FIG. 3A on the imaging surface.

FIG. 3A provides a perspective view of certain components depicted in FIG. 2. Like elements are identified with like reference numerals. As shown, the channels of the dual channel AOM 220 have a channel separation of D along the axis S which is reduced by optical means to a single pixel separation D when projected on the imaging surface 255. Orthogonal to axis S is the AOM deflection axis F. FIG. 3B depicts these axes as projected on the imaging surface 255 of the cylindrical drum 250 by the spin mirror 235 as it is rotated by the spinner motor 240. The AOM deflection axis F rotates at the image surface 255 proportionately with the rotation angle of the spin mirror 235 as shown.

The uncorrected positions of the two laser beams A and B also rotate synchronous with the spin mirror 235 but remain orthogonal to the AOM deflection axis F. Also shown is the in-scan pixel timing axis T which remains fixed and does not rotate with the spin mirror. The AOM deflection axis F can be divided into an in-scan component Fx and a cross-scan component Fy. It should be noted that the AOM deflection axis F has a useful cross-scan component, Fy, at all spin mirror angles where cross-scan correction is required.

Figure 3C:
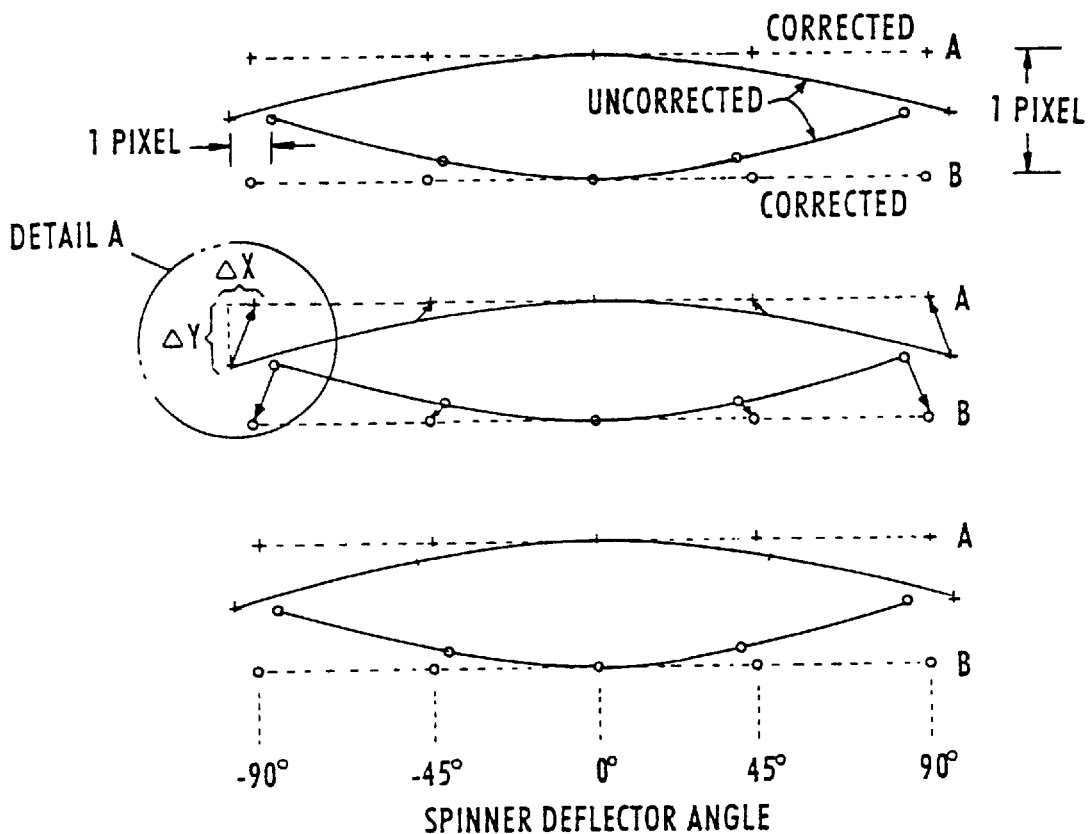
FIG. 3C shows the correction of off-axis bow by the beam deflecting AOM depicted in FIG. 2.

Referring to FIG. 3C, the two scan lines designated A and B on the imaging surface 255 are depicted as the carriage assembly is moved longitudinally through the drum 250. The solid lines indicate the respective scan line bow of the two off axis beams as they would appear without the compensation provided by each channel of the dual channel AOM 220 and pixel clocks 212A and 212B and phase shifters 214A and 214B, as described above. More particularly, as indicated by the solid lines, without the compensation the scan line separation in the cross-scan direction on the image surface would be zero when the spin mirror 235 is at ±90° rotation angle, increasing sinusoidally until a peak separation is reached at the 0° rotation angle of the spin mirror 235. The in-scan displacement error component is also depicted in which scan line A extends beyond scan line B by one pixel when the spinner is at ±90° rotation angle, with this phase error decreasing sinusoidally until it reaches zero at the 0° rotation angle. The dotted lines show the corrected paths of beams A and B respectively.

To compensate for the cross scan displacement error at the imaging plane 255 the AOM deflection axis F projected on the imaging plane 255 has a useful cross scan deflection component at all points, except at a 0° rotation angle of the spin mirror 235, where no cross scan compensation is required. However, there is also an unwanted in-scan component to the deflection caused by each beam deflecting channel of the dual channel AOM 220. The pixel timing of the emitted scanning light beams set by pixel clocks 212A and B is advanced or delayed by the phase shifters 214A and B, as appropriate, under the control of the controller 218, so as to cancel out the in-scan component of the deflection of each laser beam in the beam deflecting channels of the dual channel AOM 220 and, additionally, to correct the uncompensated in-scan displacement error component shown in FIG. 3C. Accordingly the scan displacement errors produced by the laser beams impinging the spin mirror 235 at points other than coincident with the spin axis of the spin mirror 235 are eliminated by applying cyclical AOM deflection to the beam propagated by the respective AOM channels, in synchrony with a cyclic phase control signal applied to the pixel clock signals for the beams directed to the channels. It should be understood that advantageously each channel is separately compensated, although this is not necessarily mandatory and the system could be modified so that only one beam is off-axis such that only one phase shifter and one AOM deflection element could be used if desired.

Figure 4:
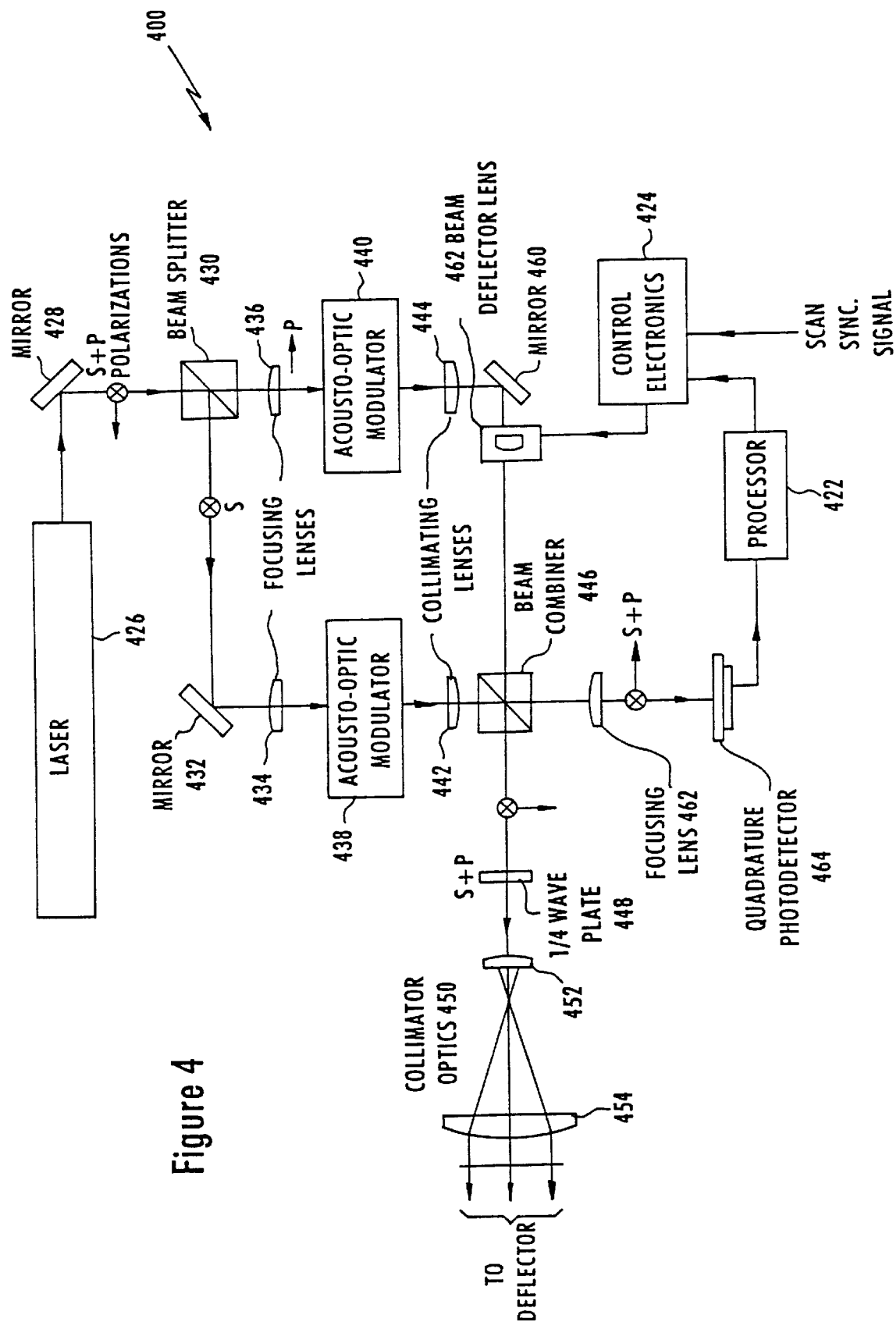
FIG. 4 depicts a third embodiment of a beam scanning system having a two direction beam deflecting lens element and a deflected beam detector in accordance with the present invention.

FIG. 4 detects a still further embodiment of the present invention in which a beam deflector lens is utilized to move, e.g. rotate, a beam in a multi-beam system about the spin axis of a deflector element to provide two non-intersecting beams on an imaging surface. The FIG. 4 system 400 is similar to the previously proposed system described in the above-mentioned '351 patent but provides substantially simplified operation by eliminating the piezo controlled wobble mirror.

As shown in FIG. 4, a laser 426 directs a single beam to stationary mirror 428. The beam is reflected off stationary mirror 428. The laser power is equally divided into S and P polarized beam components which are separated by means of a polarization sensitive beam splitter 430 with the respective beams directed from the beam splitter 430 along separate paths. The beam splitter 430 could be a multi-layer dielectric coated mirror or a grating element.

The S beam is folded by the stationary mirror 432 and focused by lens 434 prior to being directed through the acousto-optic modulator (AOM) 438. From AOM 438 the beam is directed through collimating lens 442 to beam combiner 446. The P beam is directed through focusing lens 436 and AOM 440 before being collimated by collimating lens 444. In this embodiment, AOM's 438 and 440 serve solely as modulators, i.e. do not deflect the P-beam or the S-beam. The collimated P beam is reflected by stationary mirror 460 along a path passing through the beam deflector lens 462 which is a translating lens similar to beam deflector lens 180 of FIG. 1. The lens is translated in at least two orthogonal directions simultaneously to precess or rotate about its stationary optical axis, thereby deflecting the P polarized beam such that it rotates about the spin axis of the deflector (not shown), as has been previously described.

The beam combiner 446 is essentially identical to the beam splitter 430, but operated in reverse. The combined beam is transmitted to a quarter weight plate 448 and collimator optics 450. Collimator optics 450 include a beam expanding lens 452 and a collimating lens 454. The axis of the collimator optics 450 is the axis along which the S polarized beam is projected. Preferably this axis is coincident with the spin axis of the spin deflector and the longitudinal axis of the drum.

The beam deflector lens 462 is under the control of control electronics 424. The control electronics 424 control the driving of the lens 462 so as to translate in a precessing or rotational movement about its stationary optical axis i.e., the axis of the lens 462 when in a stationary position, to move the P polarized beam in synchrony with the rotation of the spin deflector, as has been previously described.

The FIG. 4 embodiment further includes a quadrature photodetector 464 for monitoring the relationship between the S polarized and P polarized beams downstream of beam deflector lens 462. Signals from the quadrature photodetector 464 are processed by processor 422 which may operate either in real time or non-real time to provide corresponding signals to the control electronics 424 to control or modify the control of the beam deflector lens 462. Accordingly, a small portion of both the P beam and the S beam is transmitted from the beam combiner 446 onto quad detector 464 via focusing lens 462.

The quarter wave plate 448 imposes a phase shift of 90° at the wavelength of the laser beams. Accordingly the combined beam which impinges upon the spin deflector (not shown) are dual beams with circular polarization of opposite states. The feedback signals from the photodetector 464 are used in conjunction with signals representing the rotation of the spin deflector, such as signals issued by a deflector shaft encoder, to monitor, control or adjust rotation of the P beam about the S beam. The S polarized beam is directed coincident with the spin axis of the spin deflector. Accordingly, these signals are used to synchronize P beam rotation with the angular position of the spin deflector, as will be well understood by those skilled in the art.

Figure 5A:
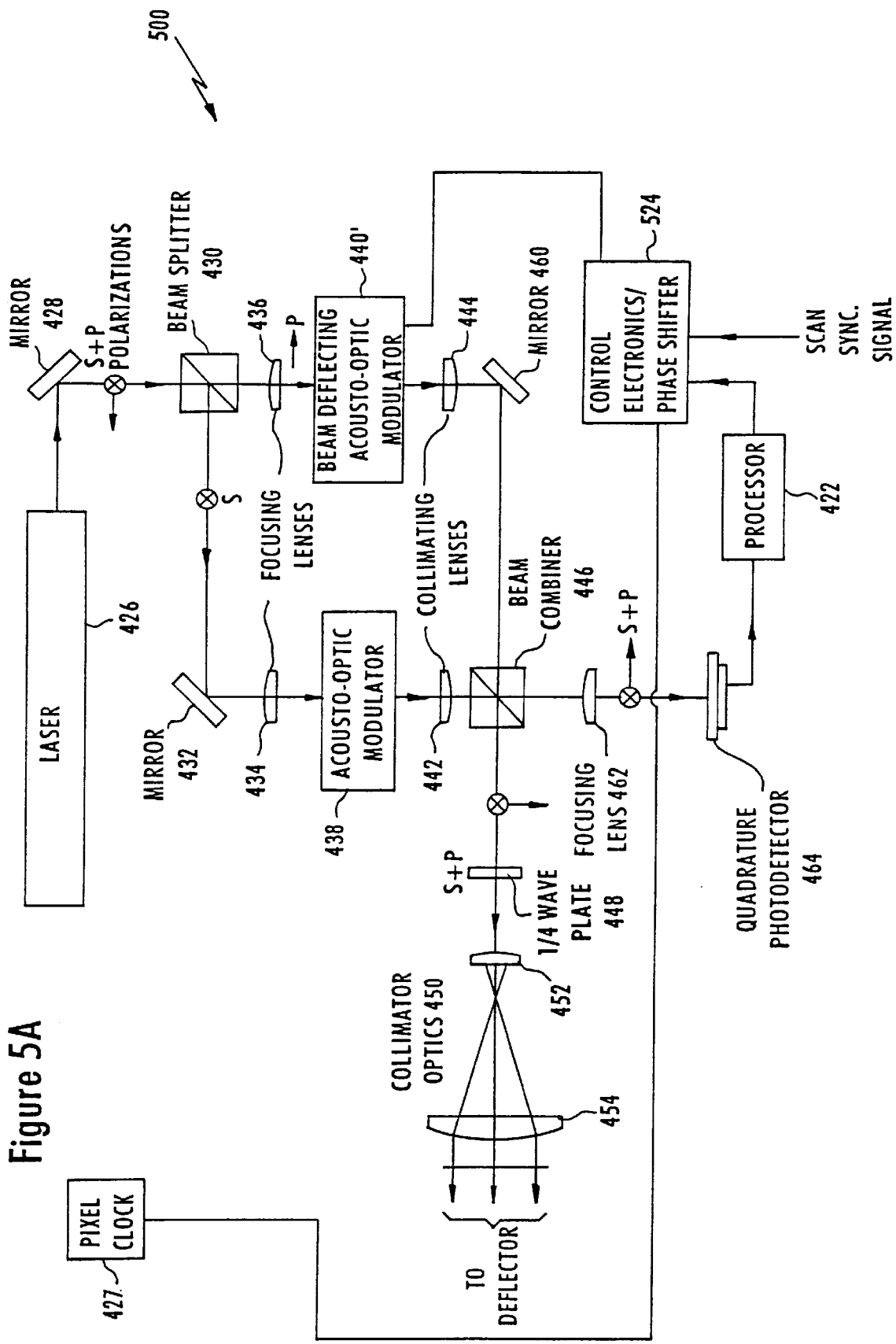
FIG. 5A depicts a forth embodiment of a beam scanning system similar to that depicted in FIG. 4, but with a beam deflecting acoustic-optical modulator element and pixel clock substituted for the beam deflecting lens element of FIG. 4 in accordance with the present invention.

FIG. 5A depicts a multi-beam scanning system 500 which is similar to that depicted in FIG. 4, but in which the acousto-optic modulator 440 is replaced with a beam deflecting acousto-optic modulator 440', the control electronics 424 is replaced by control electronics/phase shifter 524, and a pixel clock 427 is provided. Also eliminated in the FIG. 5 system is the beam deflector lens 462 of FIG. 4. As discussed above in connection with the FIG. 2 system, the beam deflecting AOM 440', pixel clock 427 and control electronics/phase shifter 524 are conjunctively operated with the spin deflector as previously described to redirect the P beam about the S beam. The S beam is preferably directed coincident with the spin axis of a spin deflector (not shown), and accordingly is unaffected by the rotation of the spin deflector.

Figure 5B:
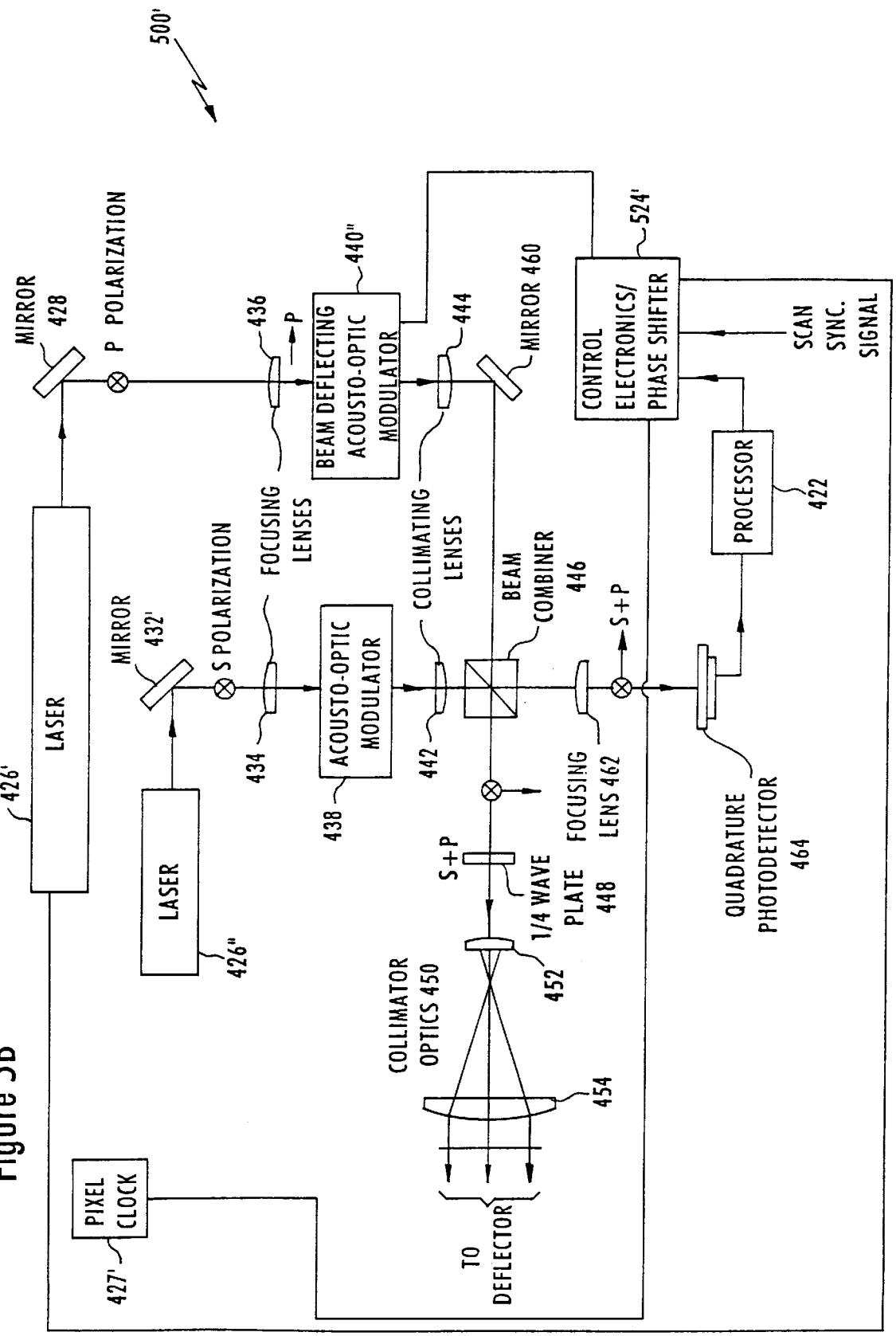
FIG. 5B depicts a slightly modified version of the beam scanning system depicted in FIG. 5A in accordance with the present invention.

FIG. 5B depicts a multi-beam scanning system 500'which is similar to the multi-beam system depicted in FIG. 5A. Accordingly, like elements are designated with identical reference numerals. In the FIG. 5B system the pixel clock 427' and control electronics/phase shifter 524' control the emission of the beam radiating from the laser source 426', in lieu of controlling the emissions from the AOM 440". Accordingly, the AOM 440" is controlled by the control electronics/phase shifter 524' to deflect the beam to move linearly and the laser 426' is controlled by the pixel clock 427' and control electronics/phase shifter 524' to phase shift the beam thereby redirecting the P beam to scan the rotating spin deflector in phase alignment with the S beam. An addition laser 426" is provided, thereby eliminating the need for beam splitter 430 of FIG. 5A. Also, stationary mirror 432' is substituted for mirror 432 due to the addition of laser 426".

Figure 6:
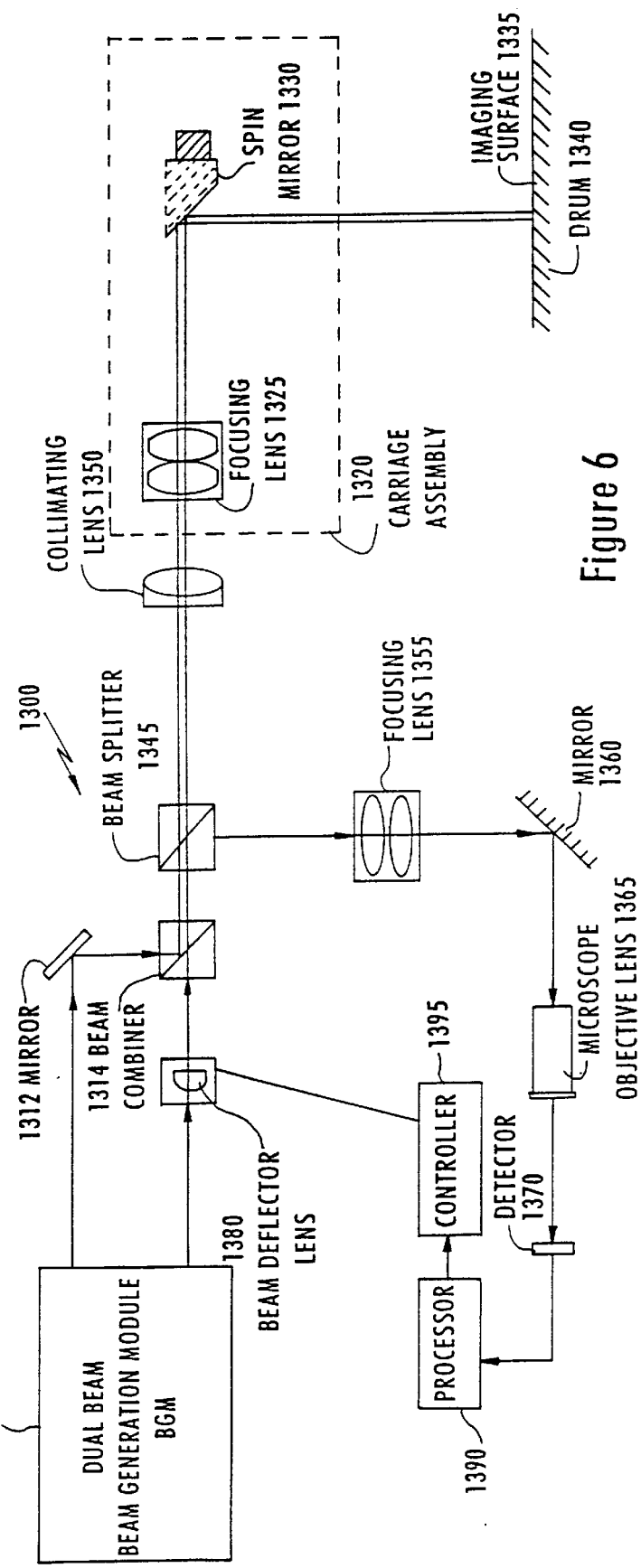
FIG. 6 depicts a fifth embodiment of a beam scanning system having a beam deflecting lens element, a dual beam generation module (BGM) and a deflected beam detector in accordance with the present invention.

FIG. 6 depicts still another embodiment of a multi-beam scanning system 1300 in accordance with the present invention. As depicted a dual beam generation module (BGM) 1310 emits dual beams, one of which is directed through a beam deflector lens 1380 which is substantially similar to the beam deflector lens described above with reference to FIG. 1. The second beam is directed to stationary mirror 1312 and reflected by stationary mirror 1312 to beam combiner 1314.

Figure 7:
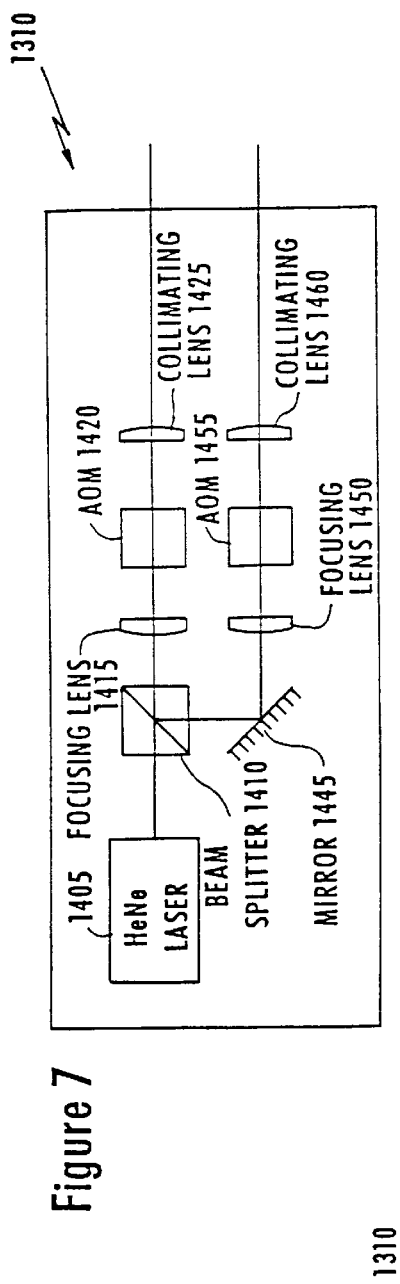
FIG. 7 details the BGM depicted in FIG. 6.

As shown in FIG. 7, the dual beam BGM 1310 includes a helium neon laser 1405 which directs a beam of light through a beam splitter 1410. From the beam splitter 1410, a first beam is propagated along the first path to stationary mirror 1445 which reflects the beam through focusing lens 1450. The focused beam is modulated in acousto-optic modulator (AOM) 1455 and collimated by collimating lens 1460 before being emitted from the BGM 1310. A second beam is transmitted on a path through focusing lens 1415. The focused beam is modulated by AOM 1420 and collimated by collimating lens 1425.

Returning to FIG. 6, the beam rotated by beam deflector lens 1380 and the beam reflected from stationary mirror 1312 are combined in beam combiner 1314. A portion of the combined beam is directed by beam splitter 1345 along a path through focusing lens 1355. The focused beam is reflected by stationary mirror 1360 through a microscope objective lens 1365 and onto a detector 1370 which may be a quadrature photodetector similar to that described with reference to FIG. 4. Signals from the detector 1370 are processed in processor 1390 which instructs the controller 1395 to properly control the beam deflector lens 1380 such that the beam passing through the deflector lens 1380 is properly rotated about the beam reflected by stationary mirror 1312 which is directed coincident to the spin axis of the spin mirror 1330.

The combined beams are directed to the collimating lens 1350 and focused by focusing lens 1325 onto the imaging surface 1335. The spin mirror 1330 deflects the combined beams to form 2 non-intersecting scan lines on the imaging surface 1335 of the cylindrical drum 1340. As depicted in FIG. 6 the focusing lens and spin mirror are a part of a carriage assembly 1320 which is configured to move longitudinally through the drum 1340. As in the previous embodiments, the spin axis of the spin mirror 1330 is preferably coincident with the longitudinal axis of the cylindrical drum 1340 and the beam reflected by mirror 1312 is preferably directed coincident with the spin axis of the spin mirror 1330.

Figure 8:
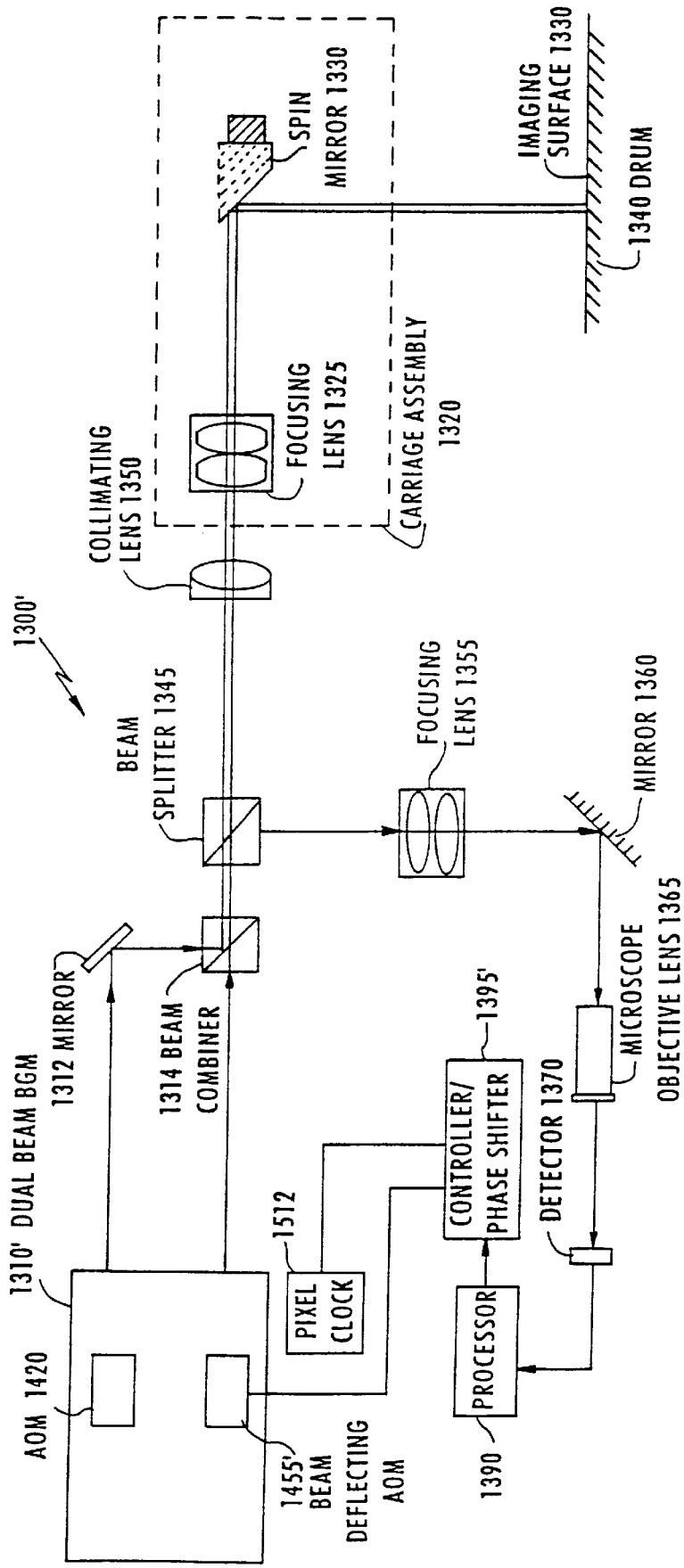
FIG. 8 depicts a sixth embodiment of a beam scanning system similar to that depicted in FIG. 6, but with a beam deflecting acoustic-optical modulator element and pixel clock substituted for the beam deflecting lens element of FIG. 6 in accordance with the present invention.

FIG. 8 depicts a still further embodiment of a multi-beam system 1300' in accordance with the present invention. This embodiment is similar to the FIG. 6 embodiment and like components are identified with like reference numerals. However, in this embodiment the beam deflector lens 1380 of the FIG. 6 embodiment has been replaced by a beam deflecting AOM 1455', the controller 1395 is replaced by controller/phase shifter 1395' and a pixel clock 1512 is added. The AOM 1455' is clocked and controlled by the controller 1395' as previously discussed in detail. The AOM 1455' is thereby controlled so as to deflect and phase shift one of the beams emitted from the dual beam BGM 1310' so that the beam is redirected to form a scan line across the spin mirror 1330 and be in phase with the other beam emitted by the dual beam BGM 1310'. The light beam is redirected such that the beams deflected by spin mirror 1330 form two non-intersecting e.g. parallel, scan lines, with minimal bow, on the imaging surface 1335 as has been described in detail above.

Figure 9:
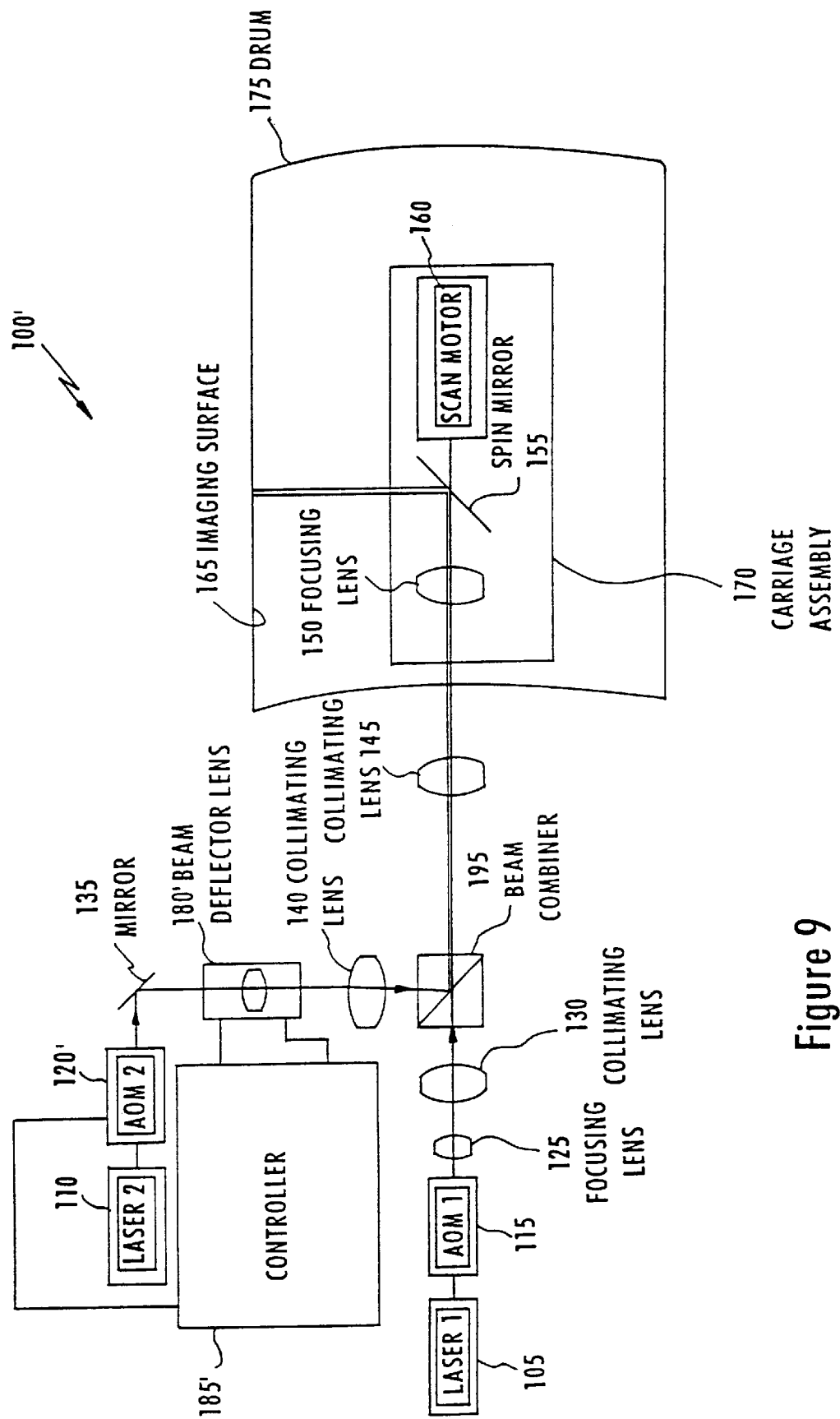
FIG. 9 depicts a seventh embodiment of a multibeam scanning system having a single direction beam deflecting lens element in conjunction with a beam deflecting acoustic-optical modulator element in accordance with the present invention.

FIG. 9 depicts a still further embodiment of the subject invention which combines aspects of the FIGS. 1 and 2 embodiments to redirect at least one beam in a multi-beam scanning system to scan a curved imaging surface with multiple non-intersecting scan lines. The FIG. 9 system 100' is similar to FIG. 1 except as will be discussed below. Accordingly, like components are referenced with like reference numerals.

As depicted in FIG. 9, a laser 105 emits a first light beam directed on a path coincident with the spin axis of the spin mirror 155 just as in the FIG. 1 embodiment. A second laser 110 emits a beam which is received by a beam deflecting acousto-optic modulator 120' which deflects the emitted beam in a first direction. The AOM 120' is substantially similar to one channel of the dual channel AOM 220 described above with reference to the FIG. 2 system.

The deflected beam is then reflected off stationary mirror 135 along a path through a beam deflector lens 180' which is configured to translate in a single direction to deflect the beam in a direction orthogonal to the direction in which the AOM 120' deflects the beam emitted by laser 110. The controller 185' conjunctively controls the operation of AOM 120' and beam deflector lens 180' to cause the beam emitted from the deflector lens 180' to be redirected to move about an axis coincident to the path of the beam emitted by laser 105, and hence with the longitudinal axis of the drum 175 and the spin axis of the spin mirror 155. Accordingly, like the other embodiments of the present invention, multiple non-intersecting scan lines can thereby be formed on the curved imaging surface 165 of the cylindrical drum 175.

Figure 10:
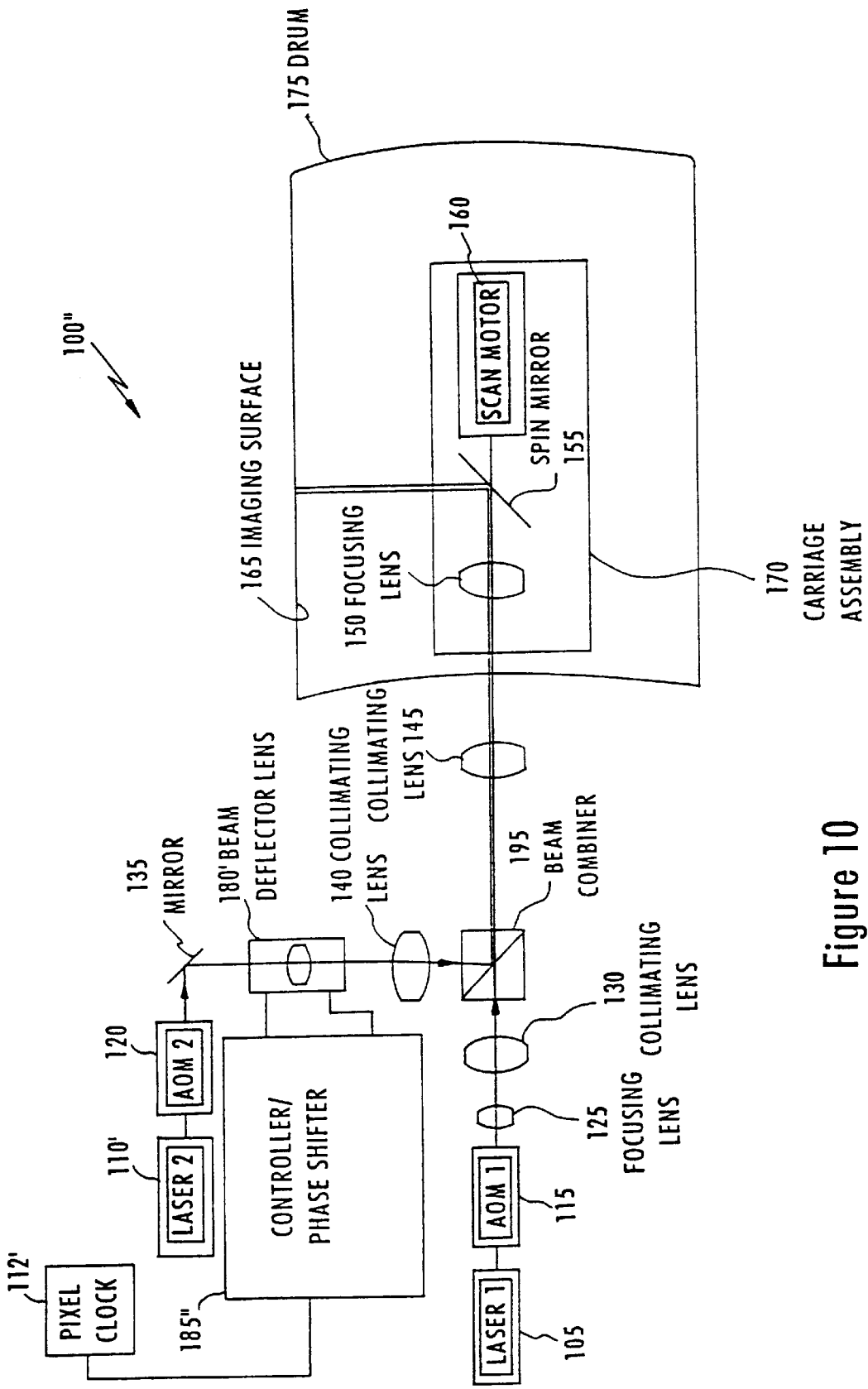
FIG. 10 depicts an eight embodiment of a multibeam scanning system having a single direction beam deflecting lens element in conjunction with a pixel clock in accordance with the present invention.

Turning now to FIG. 10, another hybrid embodiment of the present invention is shown. FIG. 10 is also similar to FIG. 1 and like components are identified with like reference numerals. As shown, in the system 100" the second light beam emitted by laser 110 is again directed through the acousto-optic modulator 120 and on to the stationary mirror 135. The beam deflector lens 180' is similar to beam deflector lens 180' of FIG. 9 and is configured to translate in a single direction to deflect the beam to linearly scan on spin mirror 155.

A pixel clock 112' and controller/phase shifter 185" are provided to control the timing of emissions from AOM 120, or alternatively if desired from the laser 110', in a manner similar to that of pixel clock 427' and phase shifter 524' described in connection with the FIG. 5B embodiment. Accordingly, by providing the proper timing signals to the AOM 120 the laser light beam emitted by AOM 120 is phase shifted so as to be phase aligned with the other beam when scanned on imaging surface 165.

Both the pixel clock 112' signal phasing and beam deflector lens 180' are controlled by controller/phase shifter 185" to conjunctively operate in synchrony such that the beam emitted from the beam deflector lens 180' is redirected to move cyclically or oscillate and thereby form a single scan line on the spin mirror 155. Accordingly, non-intersecting, phase aligned multiple scan lines will be formed on the curved imaging surface 165 of the drum 175.

Figure 12:
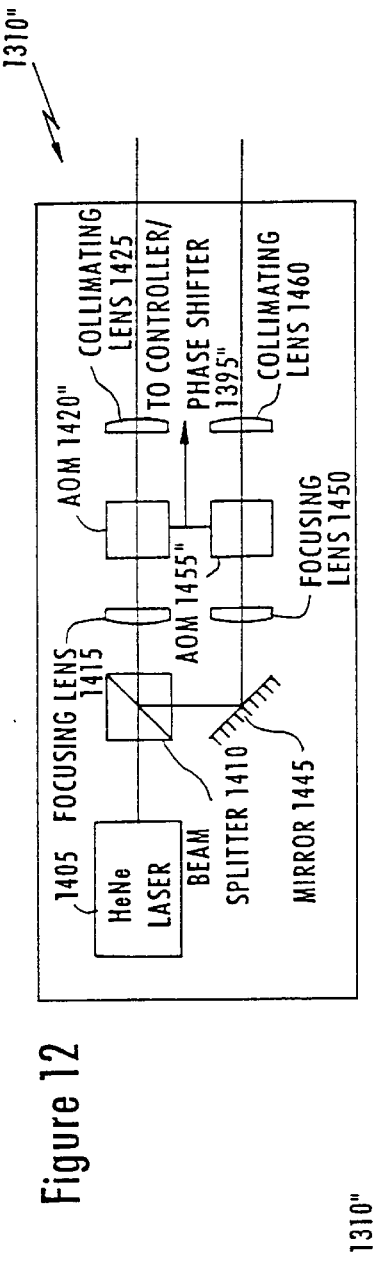
FIG. 12 details the BGM depicted in FIG. 11.
Figure 11:
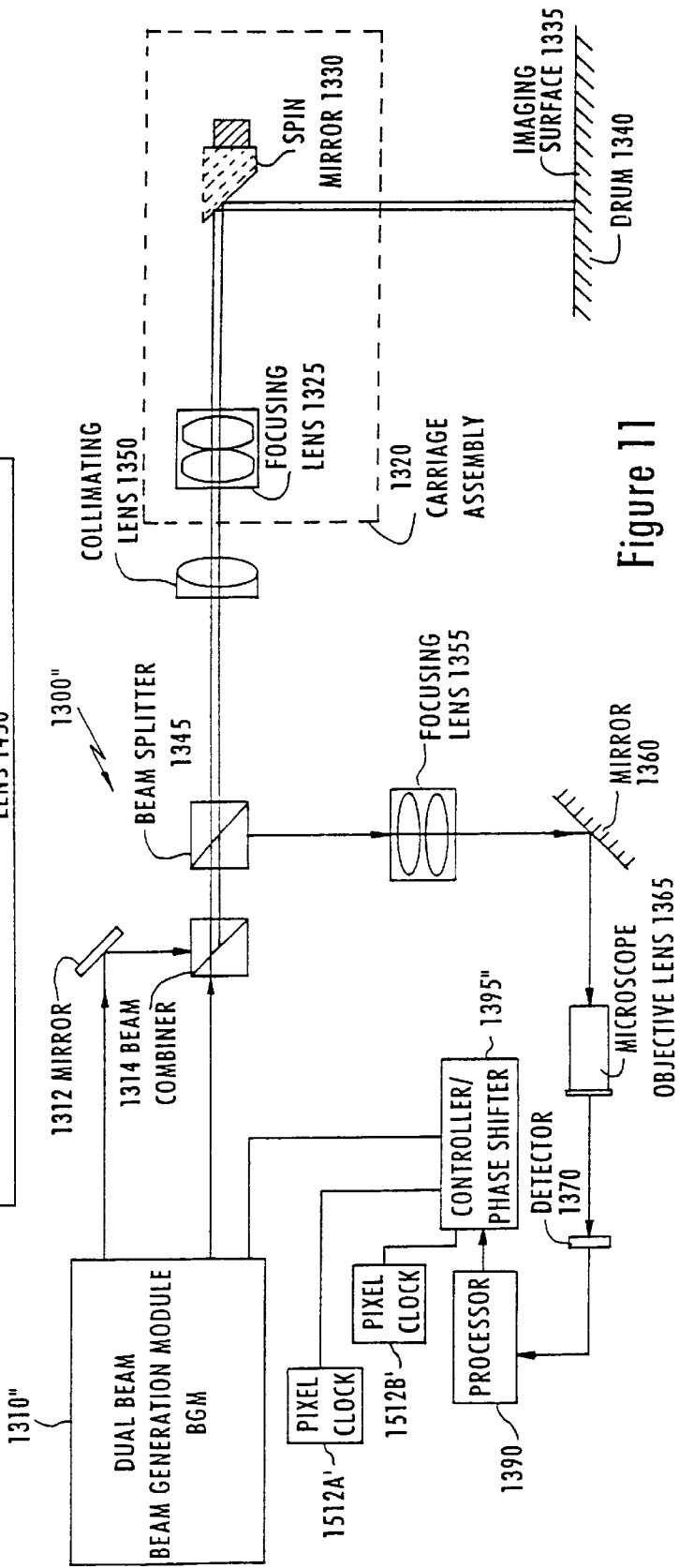
FIG. 11 depicts a ninth embodiment of a multi-beam scanning system having respective beam deflecting AOMs in conjunction with a pixel clock for deflecting multiple beams in accordance with the present invention.

FIG. 11 depicts a ninth embodiment of a multi-beam scanning system 1300". The system is similar to that depicted in FIGS. 6 and 8 and accordingly like elements are identified with like reference numerals. The scanning system 1300", however, does not include a beam deflecting lens or a beam deflecting AOM which is external to the beam generation module. As indicated in FIG. 12 which details the BGM 1310", the AOMs 1420" and 1455" are each controlled by the controller/phase shifter 1395" and are associated with pixel clocks 1512A" and 1512B", respectively, which are operated such that the AOMS 1420" and 1455" deflect and phase shift the respective beams emitted from the BGM 1310'' so as to be phase aligned and redirected to linearly scan the spin mirror 1330'' and in synchrony with the rotation thereof. It should be noted that AOM 1420'' and AOM 1455'' simultaneously modulate and deflect the beams. Further, preferably the beams are deflected so as to impinge upon the spin mirror 1330'' at an equal distance from the spin axis and at opposed points on the mirror 1330''.

Figures 13, 14:
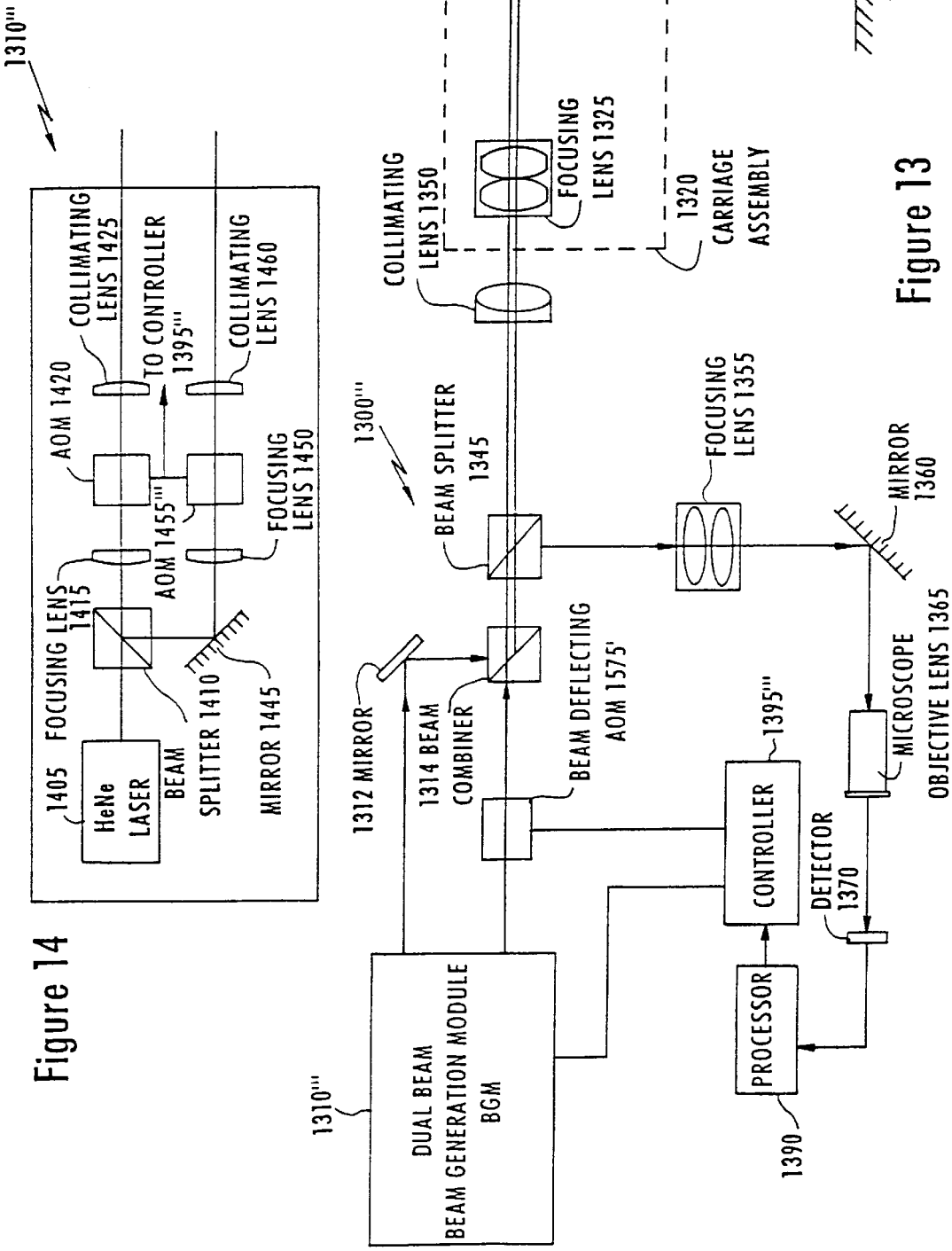
FIG. 13 depicts a tenth embodiment of a multi-beam scanning system having two beam deflecting AOMs in a single beam path.
FIG. 14 details the BGM depicted in FIG. 13.

Turning now to FIGS. 13 and 14. A tenth embodiment of a multi-beam scanning system 1300''' is depicted. System 1300''' is similar to the systems depicted in FIG. 6 and particularly FIG. 8. In system 1300''', two AOMs 1455''' and 1575' are utilized to deflect one of the beams in two directions to cause the beam to be redirected to move about the spin axis of the spin mirror 1330 and in synchrony therewith. Both AOMs 1455''' and 1575' are controlled by the controller 1395''' in the same manner as has been discussed above, the respective AOMs being controlled to deflect each the beam in different orthogonal directions.

As described above, the present invention provides a multi-beam scanning system which does not require a spin or wobble element to rotate one or more of the multiple beams. The described scanning systems has reduced banding and/or twinning. The scanning systems are capable of scanning multiple beams having a desired geometric relationship with respect to each other. The scanning systems also can scan multiple beams in a desired manner with respect to the spin axis of a spin deflector.

It will also be recognized by those skilled in the art that, while the invention has been described above in terms of preferred embodiments it is not limited thereto. Various features and aspects of the above described invention may be used individually or jointly. Further, although the invention has been described in the context of its implementation in a particular environment and for particular applications, e.g. electronic prepress applications, those skilled in the art will recognize that its usefulness is not limited thereto and that the present invention can be beneficially utilized in any number of environments and implementations. Accordingly, the claims set forth below should be construed in view of the full breadth and spirit of the invention as disclosed herein.

We claim:

1. A multibeam scanning system for scanning a curved imaging surface, comprising:
   at least one radiation emitter configured to emit a first beam of radiation and a second beam of radiation;
   a spin deflector, rotatable about a spin axis, configured to direct the first beam to form a first scan and the second beam to form a second scan line on said imaging surface; and
   at least one translating element, disposed in the path of at least one of the first and the second beams and upstream of said spin deflector, translatable in at least two substantially orthogonal directions, and operable to deflect said at least one beam with respect to the spin axis of the spin deflector.

2. A scanning system according to claim 1, wherein said at least one translating element is configured to deflect the at least one beam such that the first scan line and the second scan line are non-intersecting.

3. A scanning system according to claim 1, wherein said at least one translating element is translatable in synchrony with rotation of said spin deflector.

4. A scanning system according to claim 1, further comprising a detector configured to detect a geometric relationship between the second beam and the first beam.

5. A scanning system according to claim 4, further comprising a controller and wherein said controller is configured to control translation of said at least one translating element in accordance with the detected relationship.

6. A scanning system according to claim 4, wherein said detector includes a quadrature photodetector.

7. A scanning system according to claim 4, wherein the detector is configured to detect the geometric relationship prior to writing on the imaging surface.

8. A scanning system according to claim 1, wherein said first beam impinges upon the spin deflector at a first location relative to the spin axis of the spin deflector and the at least one translating element is configured to deflect the second beam so as to impinge upon the spin deflector at a second location which is different from the first location.

9. A scanning system according to claim 8, wherein said first location is on the spin axis of the spin deflector.

10. A scanning system according to claim 1, wherein the at least one translating element is a beam deflecting lens.

11. A scanning system according to claim 1, further comprising a pixel clock configured to issue a signal for timing the emitting of radiation from one of said at least one radiation emitter, and a phase shifter for adjusting the timing of the signal, wherein:
    the at least one translating element includes a beam deflecting lens to deflect the second beam to move linearly across the spin deflector;
    the pixel clock and the phase shifter are operable in synchrony with the operation of the beam deflecting lens to phase shift the second beam; and
    the deflection of the second beam in relationship with rotation of the spin deflector about the spin axis and the phase shifting of the second beam result in the second scan line being non-intersecting and in phase with the first scan line.

12. A scanning system according to claim 1, further comprising a beam deflecting acousto-optic modulator configured to deflect said second beam, wherein:
    the at least one translating element includes a beam deflecting lens operable to deflect the second beam in a first direction and in a second direction; and
    the deflection of the second beam in the first and the second directions causes the second beam to move in synchrony with rotation of the spin deflector about the spin axis, such that the first scan line and the second scan line are non-intersecting.

13. A method of scanning a curved imaging surface with multiple beams, comprising:
    emitting a first beam of radiation and a second beam of radiation;
    rotating a spin deflector about a spin axis to direct the first beam to form a first scan line and the second beam to form a second scan line on said imaging surface; and
    simultaneously translating an element in two substantially orthogonal directions, the element being disposed in the path of the second beam and upstream of said spin deflector, to deflect said second beam with respect to the spin axis of the spin deflector.

14. A scanning method according to claim 13, wherein said translating step includes translating the element to deflect the second beam such that the first scan line and the second scan line are non-intersecting.

15. A scanning method according to claim 13, wherein said translating step includes translating the element in synchrony with rotation of said spin deflector.

16. A scanning method according to claim 13, further comprising the step of detecting a geometric relationship between the second beam and the first beam after deflection of the second beam.

17. A scanning method according to claim 16, further comprising the step of controlling the translating of the element in accordance with the detected relationship.

18. A scanning method according to claim 16, wherein the step of detecting is performed prior to writing on the imaging surface.

19. A scanning method according to claim 13, wherein the first beam impinges upon the spin deflector at a first location relative to the spin axis of the spin deflector and the step of translating includes deflecting the second beam so as to impinge upon the spin deflector at a second location which is different from the first location.

20. A scanning method according to claim 19, wherein said first location is on the spin axis of the spin deflector.

21. A scanning method according to claim 13, wherein the translating step includes translating the element in multiple directions.

22. A scanning method according to claim 13, further comprising the step of timing the emitting of radiation and wherein:
  the translating step includes translating the element to deflect the second beam to form a linear scan across the spin deflector;
  the emitting of radiation is timed so as to be synchronized with the deflection of the second beam to thereby phase shift the second beam; and
  the linear scanning of the second beam is performed in relationship with rotation of the spin deflector about the spin axis such that non-intersecting scan lines are formed on the imaging surface, and the phase shifting causes the non-intersecting scan lines to be in phase.

23. A scanning method according to claim 13, wherein optically
  the deflection of the second beam in the first and the second directions causes the second beam to move in synchrony with rotation of the spin deflector about spin axis such that the first scan line and the second scan line are non-intersecting.

24. A multibeam scanning system for scanning a curved imaging surface, comprising:
  a cylindrical drum having a curved imaging surface disposed therein; at least one radiation emitter configured to emit a first beam of radiation and a second beam of radiation;
  a spin deflector, configured to rotate about a spin axis and thereby direct the first beam to form a first scan line and the second beam to form a second scan line on said curved imaging surface; and
  a translatable lens operable to deflect said second beam with respect to the spin axis to cause the second beam to move in relationship with the rotation of the spin deflector about the spin axis such that the first scan line and the second scan line are non-intersecting;
  wherein said translatable lens is disposed in only a path of the second beam and upstream of said spin deflector.

25. A scanning system according to claim 24, further comprising a pixel clock configured to issue a timing signal for timing emissions from said at least one radiation emitter and a phase shifter for adjusting the timing of the signal, wherein:
  the translatable lens is configured to translate and thereby deflect said second beam to linearly scan the spin deflector;
  the pixel clock and phase shifter are operable in synchrony with the translation of the translatable lens to phase shift the second beam; and
  the deflection of the second beam in relationship with rotation of spin deflector about the spin axis and the phase shifting of the second beam cause the scan lines to be non-intersecting and in phase.

26. A scanning system according to claim 24, further comprising a beam deflecting acousto-optic modulator operable to deflect the second beam, wherein:
  the translatable lens is configured to translate in a single direction to deflect the second beam in a first direction;
  the acousto-optic modulator is adapted to operate in synchrony with the translation of the translatable lens to deflect the second beam in a second direction, substantially orthogonal to the first direction; and
  the deflection of the second beam in the first and the second directions causes the second beam to move around the spin axis.

27. A multibeam scanning system for scanning an imaging surface, comprising:
  at least one radiation emitter configured to emit a first beam of radiation and a second beam of radiation;
  a spin deflector configured to rotate about a spin axis and thereby direct the first beam to form a first scan line and the second beam to form a second scan line on said imaging surface;
  at least one moving element operable to deflect at least one of said first and said second beams in relationship with the rotation of the spin deflector about the spin axis to cause said deflected at least one beam to form a linear scan on the spin deflector;
  at least one pixel clock configured to issue a timing signal for timing emissions of radiation from the at least one radiation emitter; and
  at least one phase shifter configured to adjust timing of the signal;
  wherein the at least one pixel clock and the at least one phase shifter are operable in synchrony with movement of the moving element to phase shift at least one of said first and said second beams such that the scan lines are non-intersecting and path aligned.

28. A scanning system according to claim 27, further comprising a cylindrical drum having a curved imaging surface and wherein the moving element is a translatable lens configured to translate in only a single direction.

29. A multibeam scanning system for scanning a curved imaging surface, comprising:
  at least one radiation emitter configured to emit a first beam of radiation and a second beam of radiation;
  a spin deflector, rotatable upon a spin axis, configured to direct the first beam to form a first scan line and the second beam to form a second scan line on said imaging surface;
  at least one non-reflecting element disposed in the path of the second beam and upstream of said spin deflector, operable to deflect said second beam with respect to the spin axis of the spin deflector; and
  a detector configured to detect a geometric relationship between the second beam and the first beam.

30. A system according to claim 29, wherein the at least one non-reflecting element is a lens translatable in a first direction and a second direction, the first and second directions being seperated by an angle of other than 180 degrees.

31. A system according to claim 29, wherein the at least one non-reflecting element includes a translatable lens operable to deflect the second beam in a first direction and an acousto-optical element operable to deflect the second beam in a second direction different from the first direction.

32. A method of scanning a curved imaging surface with multiple beams comprising:

emitting a first beam of radiation and a second beam of radiation;

rotating a spin deflector about a spin axis to direct the first beam to form a first scan line and the second beam to form a second scan line on said imaging surface;

operating at least one non-reflecting element, disposed in the path of the second beam and upstream of said spin deflector, to deflect said second beam with respect to the spin axis of the spin deflector; and detecting a geometric relationship between the second beam and the first beam.

33. A method according to claim 32, wherein the at least one non-reflecting element is a lens translatable in a first direction and a second direction, the first and second directions being seperated by an angle of other than 180 degrees.

34. A method according to claim 32, wherein the at least one non-reflecting element includes a translatable lens operable to deflect the second beam in a first direction and an acousto-optical element operable to deflect the second beam in a second direction different from the first direction.

* * * * *

UNITED STATES PATENT AND TRADEMARK OFFICE
CERTIFICATE OF CORRECTION

PATENT NO. : 5,864,418
DATED : January 26, 1999
INVENTOR(S) : Allen et al.

It is certified that error appears in the above-identified patent and that said Letters Patent is hereby corrected as shown below:

In the Claims
Column 17, claim 23, line 2, delete "optically"

Signed and Sealed this

Eighth Day of June, 1999

Attest:

Q. TODD DICKINSON

*Attesting Officer*      Acting Commissioner of Patents and Trademarks